(12) United States Patent
Matsumoto et al.

(10) Patent No.: US 9,181,679 B2
(45) Date of Patent: Nov. 10, 2015

(54) WORKING MACHINE

(71) Applicant: KUBOTA CORPORATION, Osaka-shi, Osaka (JP)

(72) Inventors: Takanori Matsumoto, Sakai (JP); Shoichi Kawano, Sakai (JP); Hiroya Hanano, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 212 days.

(21) Appl. No.: 13/788,432

(22) Filed: Mar. 7, 2013

(65) Prior Publication Data

US 2013/0330158 A1 Dec. 12, 2013

(30) Foreign Application Priority Data

Jun. 11, 2012 (JP) ................. 2012-132111

(51) Int. Cl.
*E02F 9/08* (2006.01)
*B62D 25/12* (2006.01)
*E02F 3/32* (2006.01)
*B62D 55/06* (2006.01)

(52) U.S. Cl.
CPC .............. *E02F 9/0891* (2013.01); *B62D 25/12* (2013.01); *B62D 55/06* (2013.01); *E02F 3/32* (2013.01); *E02F 9/0808* (2013.01)

(58) Field of Classification Search
CPC .......... E02F 3/32; E02F 9/0808; E02F 9/0891
USPC .......................... 180/69.2, 69.21, 89.1, 89.17; 296/190.05, 190.11; 414/687
See application file for complete search history.

(56) References Cited

U.S. PATENT DOCUMENTS

| 4,770,263 A * | 9/1988 | Yoshioka ................ 180/89.17 |
| 5,715,615 A * | 2/1998 | Murakami et al. ............ 37/379 |
| 7,134,519 B2 * | 11/2006 | Imashige .................. 180/69.24 |
| 7,503,419 B2 * | 3/2009 | Miyake ...................... 180/327 |
| 8,240,415 B2 * | 8/2012 | Okada et al. .............. 180/89.17 |
| 2005/0000746 A1 * | 1/2005 | Imashige ................. 180/69.24 |

FOREIGN PATENT DOCUMENTS

| JP | 11-081381 A | 3/1999 |
| JP | 2005-023727 A | 1/2005 |
| JP | 2008-231698 A | 10/2008 |

* cited by examiner

*Primary Examiner* — Keith Frisby
(74) *Attorney, Agent, or Firm* — Birch, Stewart, Kolasch & Birch, LLP (57) ABSTRACT

The present invention is intended to provide a working machine allowing to form a large opening angle of an equipment cover while avoiding an obstacle even existing in front thereof. A rotating base is installed on a travelling machine body which includes right and left travelling devices, wherein an operation seat and vehicle equipment are arranged in the right and left, an equipment cover for covering the vehicle equipment is openably and closably provided, and a front lower portion of the equipment cover is pivotally supported on the rotating base via a lateral shaft. The lateral shaft of the equipment cover is inclined rearward from one end which is positioned in a side of the operation seat to the other end which is positioned in a side of a side portion of the rotating base.

9 Claims, 12 Drawing Sheets

Fig. 3 (Amended)

Fig.12

WORKING MACHINE

TECHNICAL FIELD

The present invention relates to a working machine such as a back hoe including an equipment cover.

BACKGROUND ART

As disclosed in Japanese Unexamined Patent Publication JP-A2008-231698, in a conventional working machine such as a back hoe, a rotating base is disposed on a travelling machine body which includes right and left travelling devices, an engine is disposed in a rear portion of the rotating base, a working device performing an excavation work is attached to a front portion, an operation seat and vehicle equipment are respectively allocated to be disposed in a frontward left side and a right side of the engine on the rotating base, and an equipment cover covering the vehicle equipment is openably and closably provided.

In this working machine, a front lower portion of the equipment cover is pivotally supported on the rotating base about a lateral axis, and when the equipment cover is opened, the rear portion is to be largely protruded upward or frontward of the front portion.

SUMMARY OF INVENTION

Technical Problem

In this conventional technique, the lateral axis in the front lower portion of the equipment cover is disposed along a lateral direction of the rotating base and the equipment cover is largely protruded frontward at the time of opening. Therefore, when the working device is positioned in the frontward position, there may be a case where the equipment cover may collide with the working device or an opened angle may be restricted.

Therefore, an essential object of the present invention is to provide a working machine capable of solving such a conventional problem.

More specifically, the present invention is aimed to provide a working machine allowing to form a large opening angle of an equipment cover while avoiding an obstacle even existing in front thereof.

Solution to Problem

Specific means of the present invention for solving the problem are as follows.

In a first aspect of the present invention, a working machine includes: a travelling machine body including right and left travelling devices; a rotating base installed on the travelling machine body; an operation seat and vehicle equipment are arranged in the right and left on the rotating base; and an equipment cover openably and closably provided for covering the vehicle equipment, with a front lower portion of the equipment cover being pivotally supported on the rotating base via a lateral shaft, wherein the lateral shaft of the equipment cover is inclined rearward from one end which is positioned in a side of the operation seat to the other end which is positioned in a side of a side portion of the rotating base.

In a second aspect of the present invention, a rearward inclination angle α of the lateral shaft of the equipment cover is defined to be to degrees with respect to a lateral direction line of the rotating base.

In a third aspect of the present invention, an engine is installed on a rear portion of the rotating base, a working device is attached forward of the engine, the operation seat and the vehicle equipment are respectively disposed in left and right sides forward of the engine, and the lateral shaft is disposed in a right forward lower portion of the equipment cover in order to open the rear portion of the equipment cover right-outward and upward about the front lower portion as a pivotal center.

In a fourth aspect of the present invention, the right and left outside ends of the right and left travelling devices are protruded outward from the right and left outside ends in a forward attitude state of the rotating base, and wherein open attitude retaining means is provided in the vicinity of the lateral shaft of the equipment cover for retaining an outside surface of the rear upper portion of the equipment cover in a state of the equipment cover being opened.

Advantageous Effects of Invention

According to the present invention, the rear portion of the equipment cover can be opened outward and upward about the front lower portion as a pivotal center. Thus, even though there exists an obstacle in front, a large opening angle of the equipment cover can be formed while avoiding the obstacle.

In specific, according to the first aspect of the present invention, since the lateral shaft of the equipment cover is inclined rearward from one end which is positioned in a side of the operation seat to the other end which is positioned in a side of a side portion of the rotating base, the equipment cover can be opened right-outward and upward about the front lower portion as a pivotal center.

According to the second aspect of the present invention, since the rearward inclination angle α of the lateral shaft of the equipment cover is defined to be 10 to 30 degrees with respect to a lateral direction line of the rotating base, the rear portion of the equipment cover can be opened not only front-upward but also toward an outer-sideward.

According to the third aspect of the present invention, the rear portion of the equipment cover covering the vehicle equipment disposed in the right side of the rotating base can be opened right-outward and upward about the front lower portion as a pivotal center.

According to the fourth aspect of the present invention, since the open attitude retaining means is provided in the vicinity of the lateral shaft of the equipment cover, the outside surface of the rear upper portion of the equipment cover can be retained in a position within outside ends of the right and left travelling devices by the open attitude retaining means when the equipment cover is opened.

DESCRIPTION OF EMBODIMENTS

The following describes an embodiment of the present invention with reference to the drawings.

Figure 1:
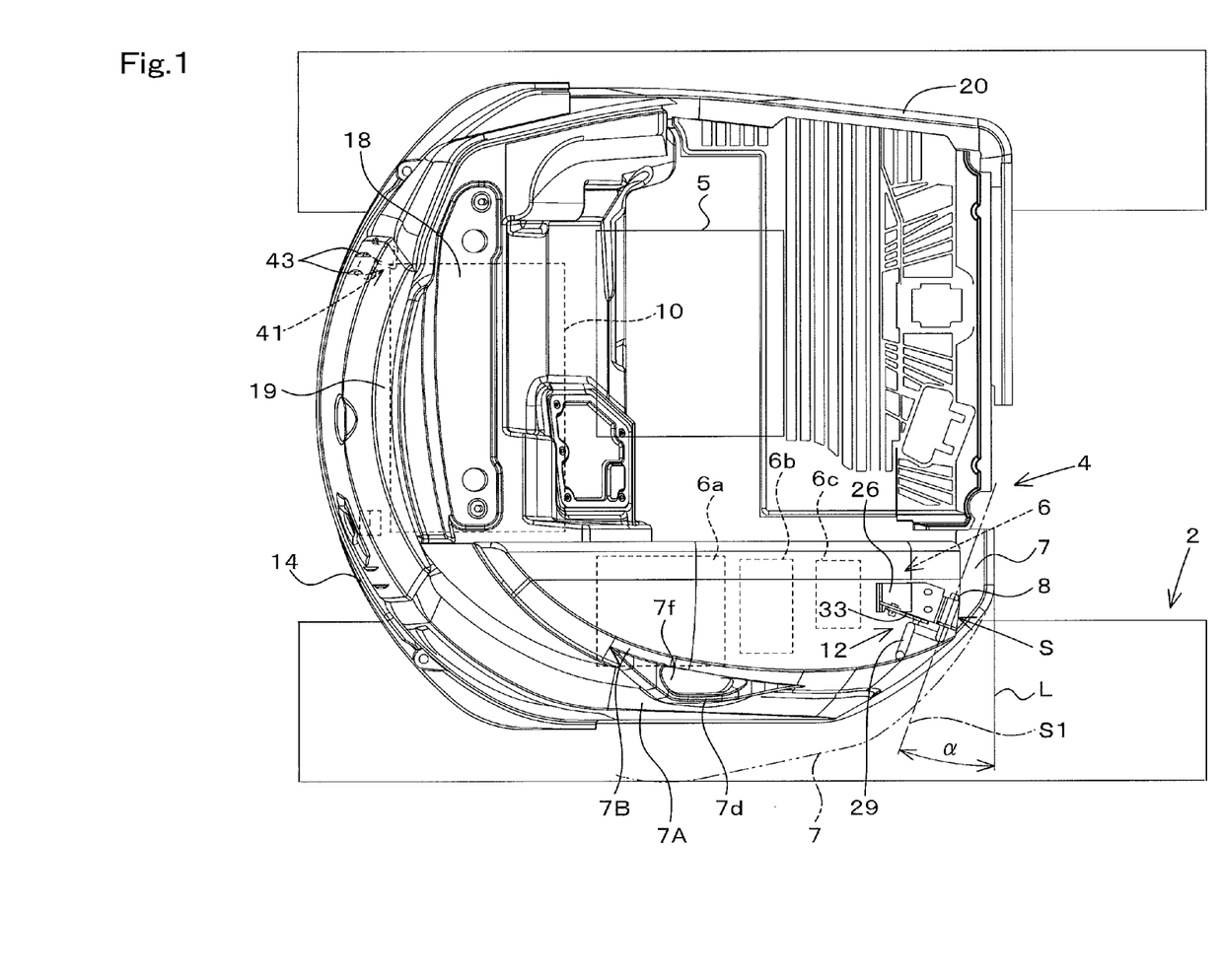
FIG. 1 is a plan view of a back hoe showing an embodiment of the present invention.
Figure 2:
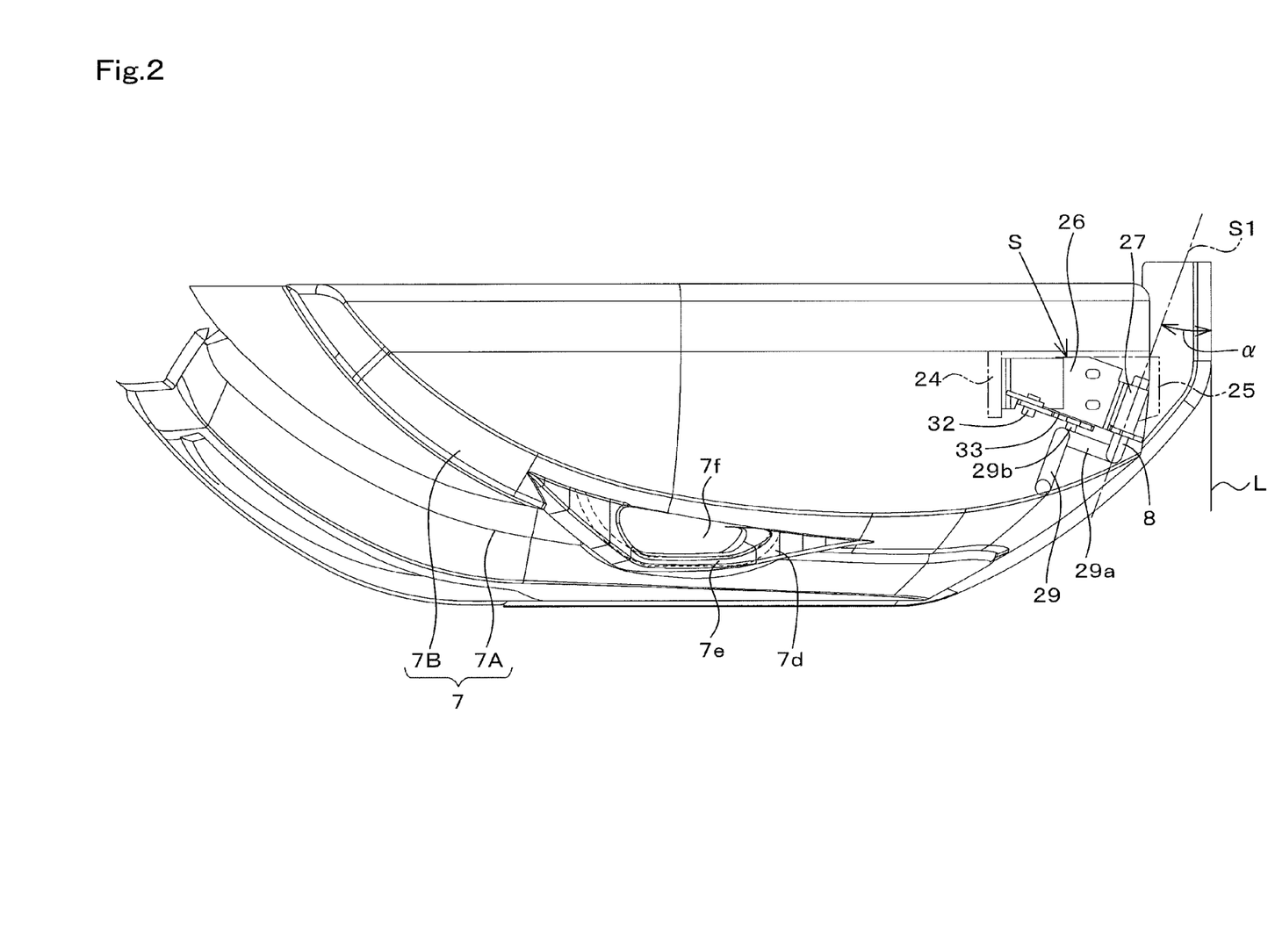
FIG. 2 is a partially cross-sectional plan view of an equipment cover.
Figure 3:
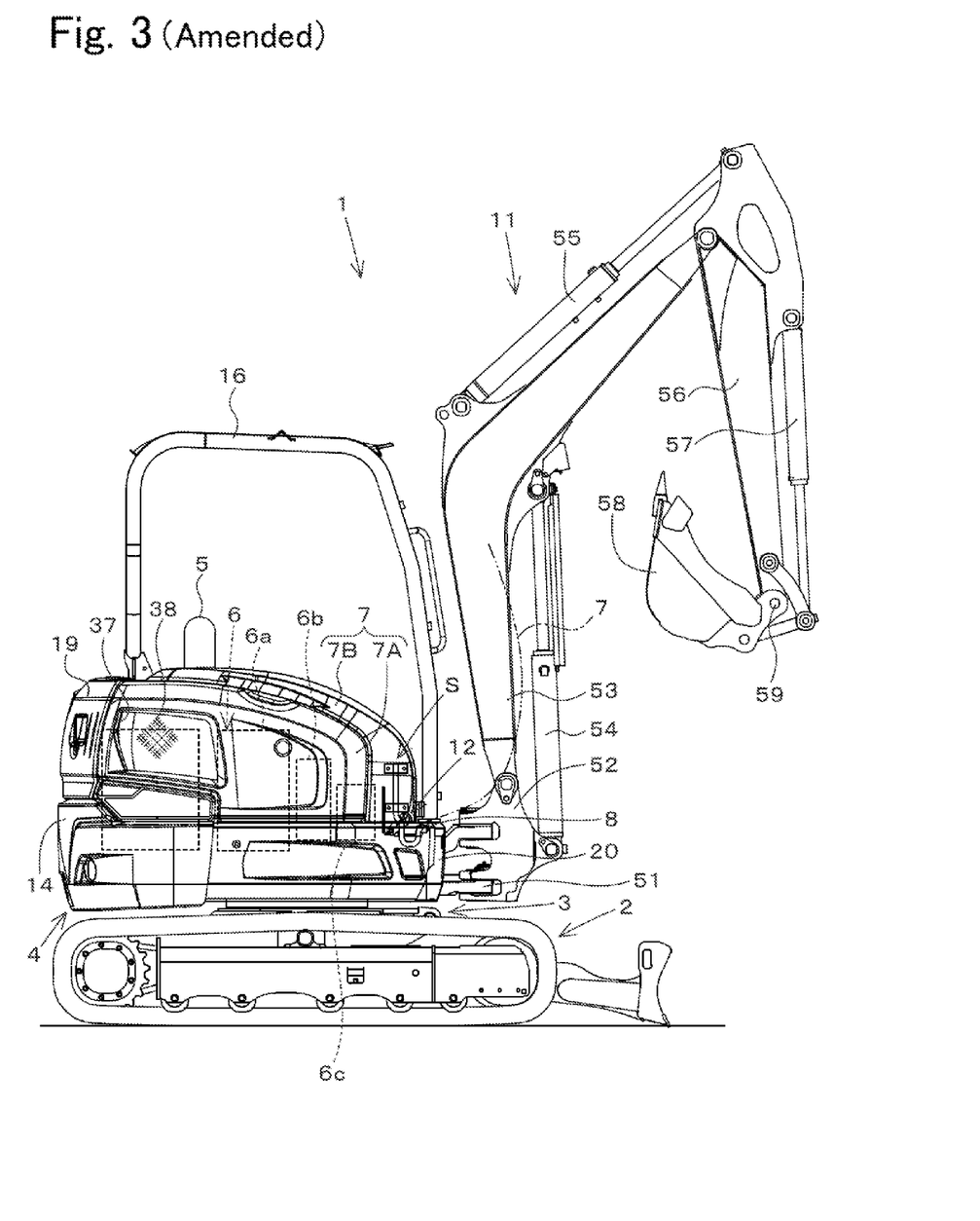
FIG. 3 is a side view of the whole part of the back hoe.

In FIGS. 1 and 3, a rearward small-turning type back hoe is shown as an example of a working machine 1. In this back hoe 1, a rotating base 4 is disposed on a travelling machine body 3 including crawler type right and left travelling devices 2 in a rotatable manner about a vertical axis, an engine 10 and a counter weight 14 are disposed on a rear portion of the rotating base 4, and a working device 11 performing an excavation work is mounted on a front portion of the rotating base 4.

In the working device 11, a swing bracket 52 is pivotally supported by a supporting bracket 51 in the front portion of the rotating base 4 in a laterally swingable manner about a vertical axis, each proximal portion of a boom 53 and a boom cylinder 54 is pivotally supported by the swing bracket 52 in a vertically swingable manner about a lateral axis, an arm 56 driven by an arm cylinder 55 is pivotally supported by a tip end of the boom 53 in a vertically swingable manner, and a working instrument (bucket) 58 rotated about a lateral axis (attitude-controlled) by a working instrument cylinder 57 is coupled to a tip end of the arm 56 via a spindle 59.

In the rotating base 4, a region forward from the engine 10 is allocated to right and left regions so that an operating portion including an operation seat 5 and a driver seat protecting device (ROPS) 16 are disposed in the left region and vehicle equipment 6 including such as a hydraulic oil tank 6a, control valve 6b, battery 6c and the like is disposed in the right region.

A supporting frame is provided in the rear portion of the rotating base 4 in a manner of straddling the engine 10. By this supporting frame, a rear portion of the ROPS 16, a fixed engine cover 18 covering an upper side and a front side of the engine 10 and an openable and closable rear bonnet 19 covering a rearward region of the engine 10 are respectively supported, and right and left side surfaces from the front of the rotating base 4 to the counter weight 14 are respectively covered with a rotating base side cover 20.

An equipment cover 7 covering the vehicle equipment 6 as well as a right-sideward region of the engine 10 is openably and closably provided in the right side portion of the rotating base 4. A front lower portion of the equipment cover 7 is pivotally supported on the rotating base 4 by a pivotally supporting mechanism S including a lateral shaft 8, wherein the lateral shaft 8 is inclined rearward from one end which is positioned in a side of the operation seat 5 to the other end which is positioned in a side of a side portion of the rotating base 4.

In FIGS. 1 to 10, the equipment cover 7 includes a sheet metal cover side portion 7A covering from a sideward region to an outside upward region of the vehicle equipment 6 and a cover upper portion 7B of a resin material attached to an upper portion and a front portion of the cover side portion 7A to cover the upward and frontward regions of the vehicle equipment 6.

Figure 5:
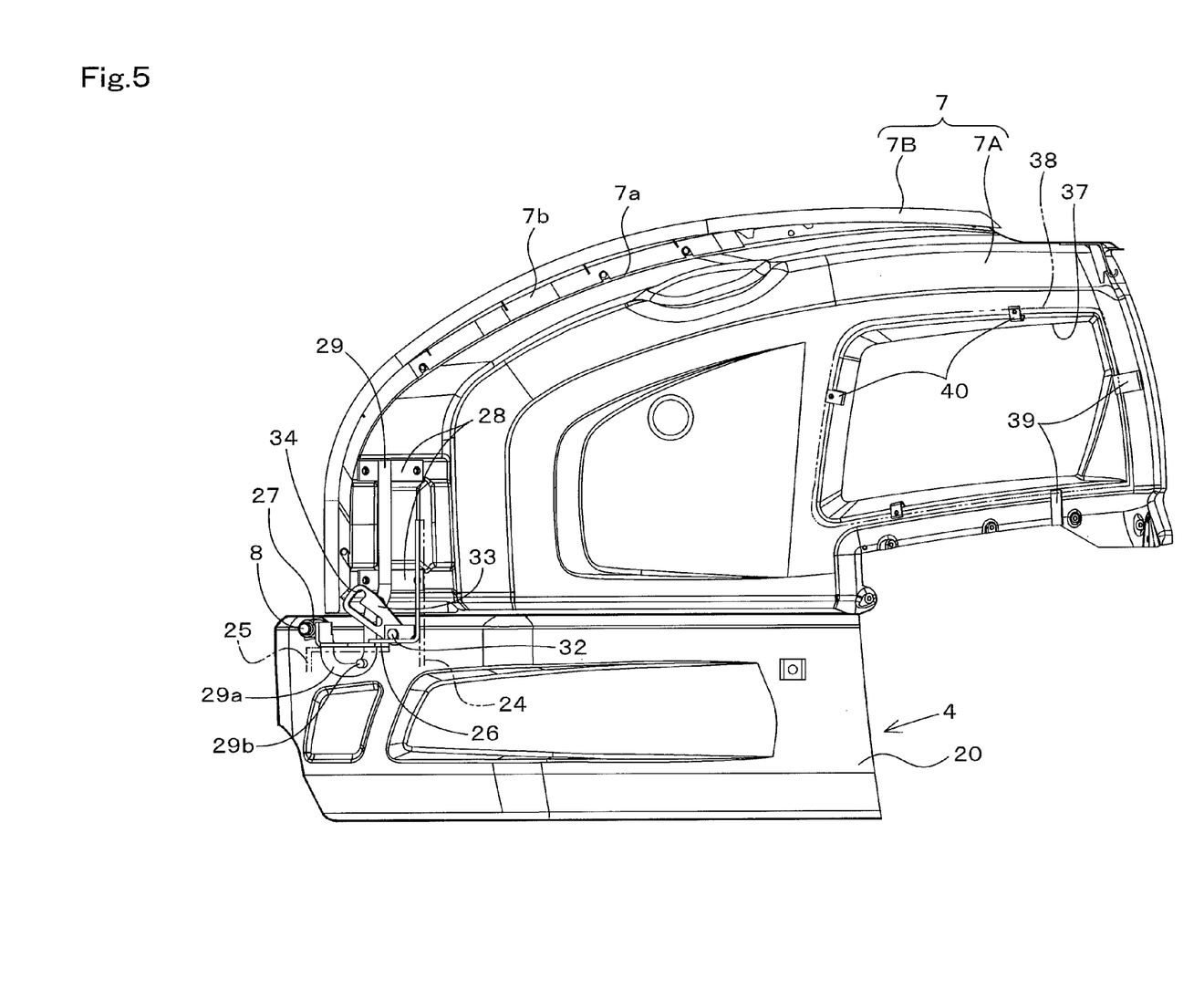
FIG. 5 is a side view of the equipment cover and the rotating base side cover when seeing from an operation seat side.
Figure 6:
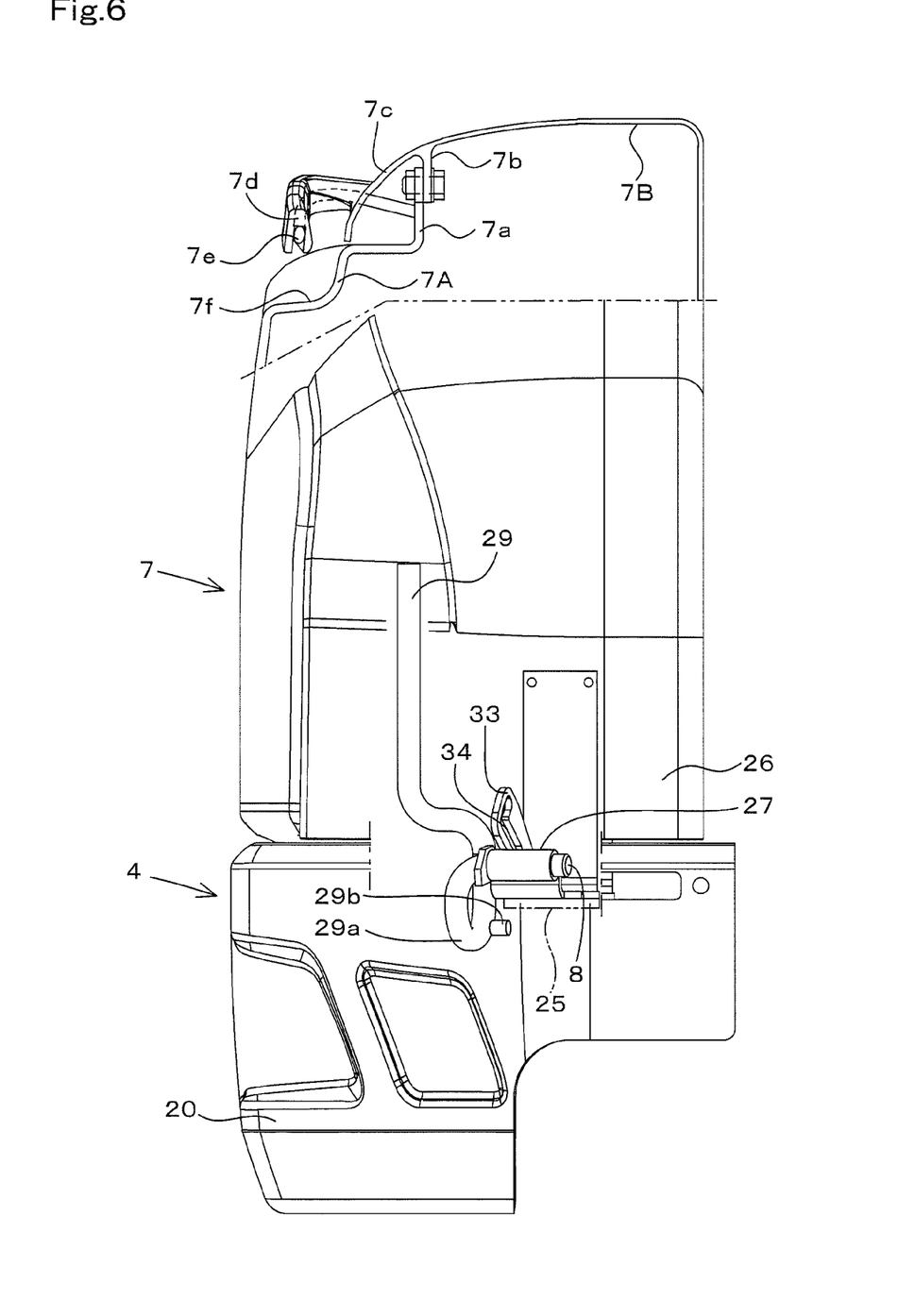
FIG. 6 is a partially cross-sectional front view of the equipment cover and the rotating base side cover.
Figure 7:
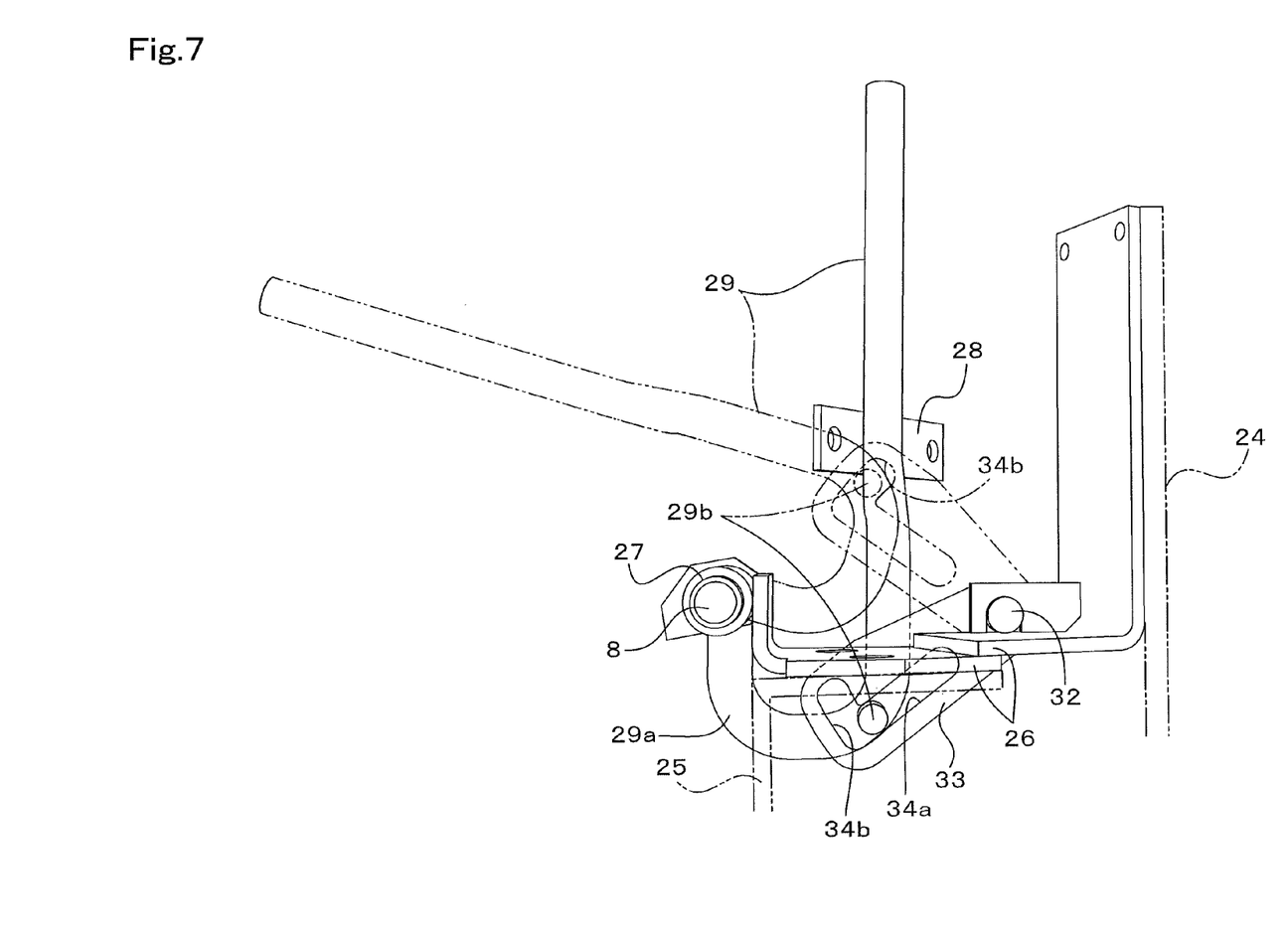
FIG. 7 is a front view of a pivotally supporting mechanism when viewing along a horizontal axis direction.
Figure 8:
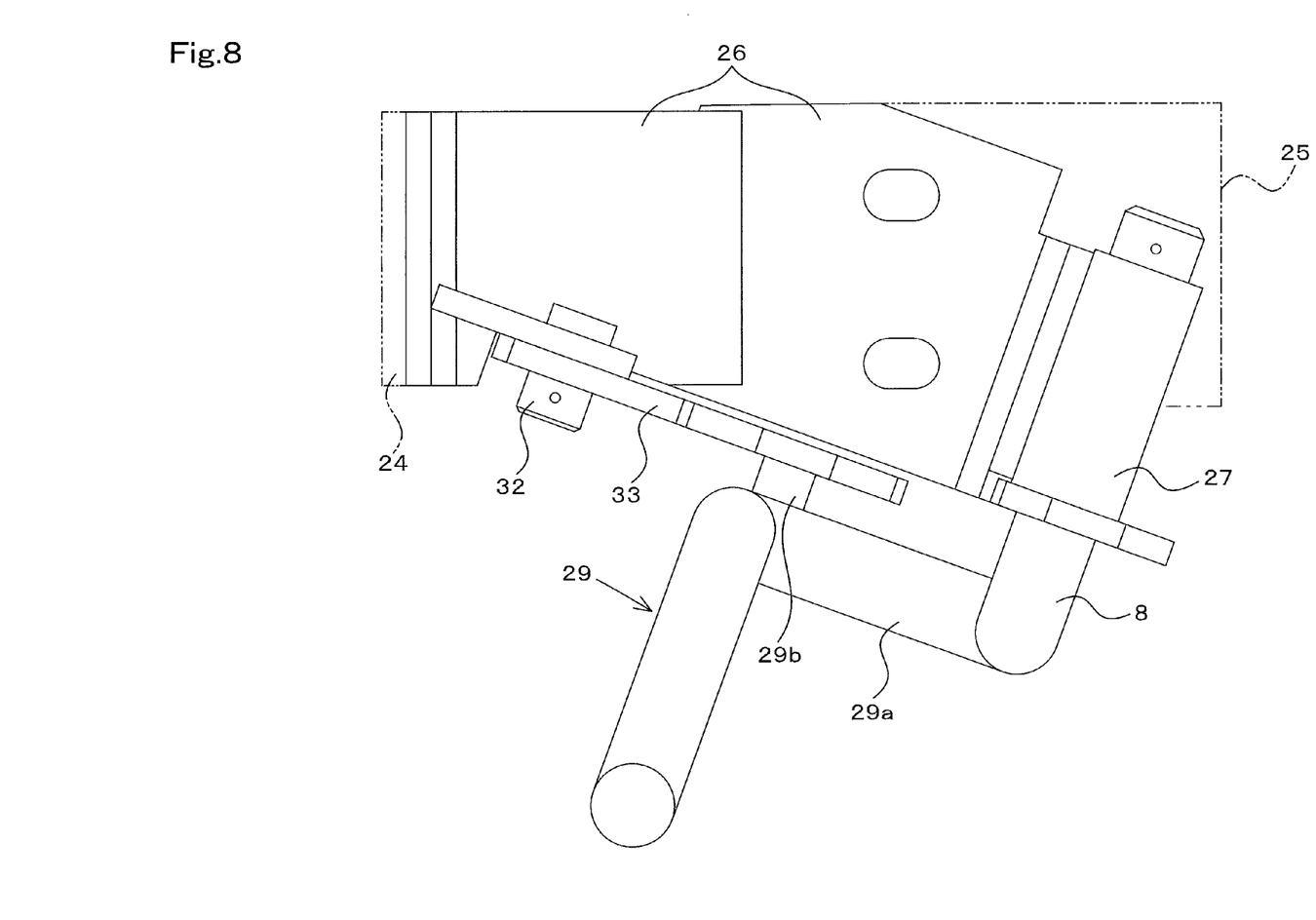
FIG. 8 is a plan view of the pivotally supporting mechanism.
Figure 9:
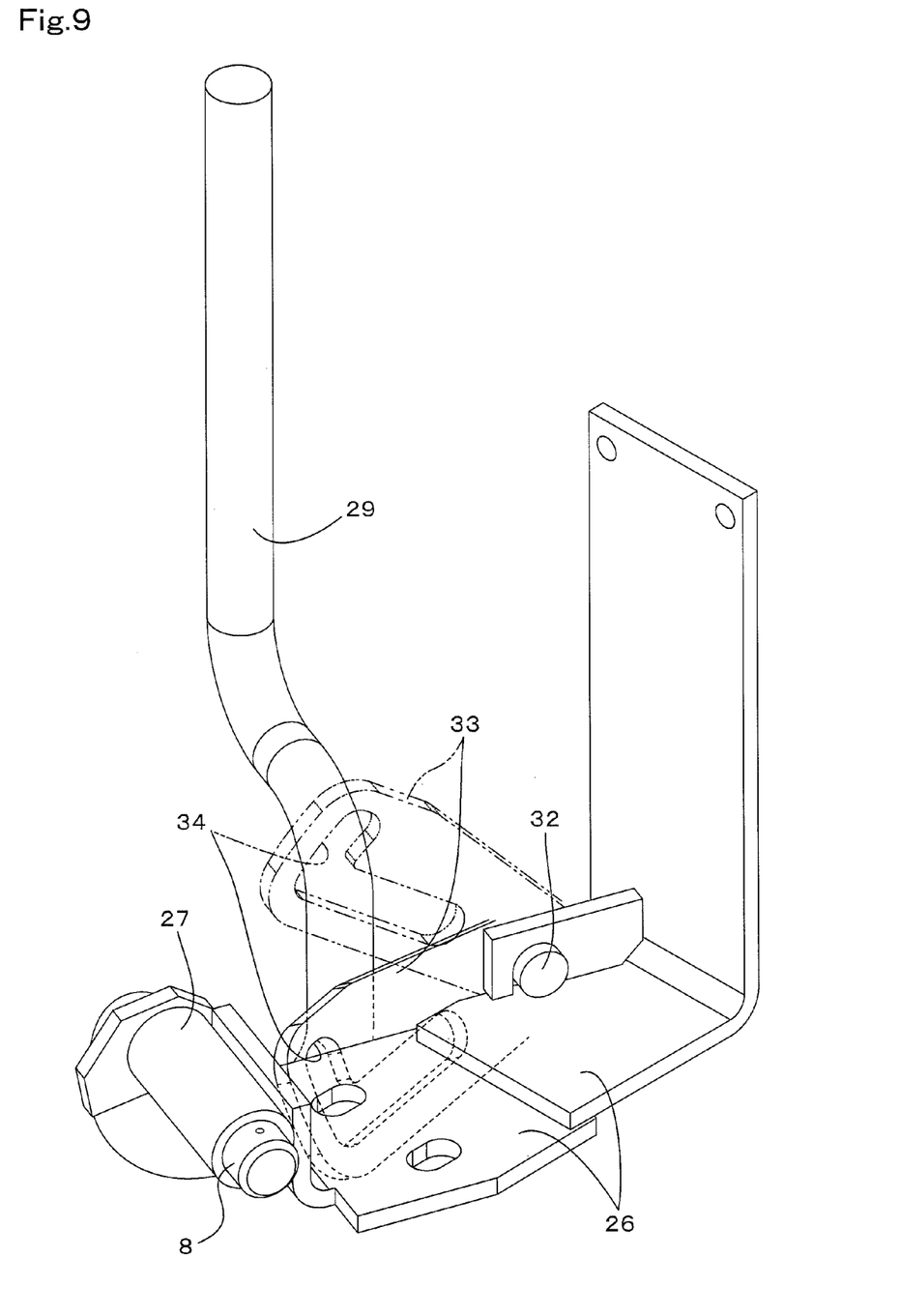
FIG. 9 is a perspective view of the pivotally supporting mechanism.
Figure 10:
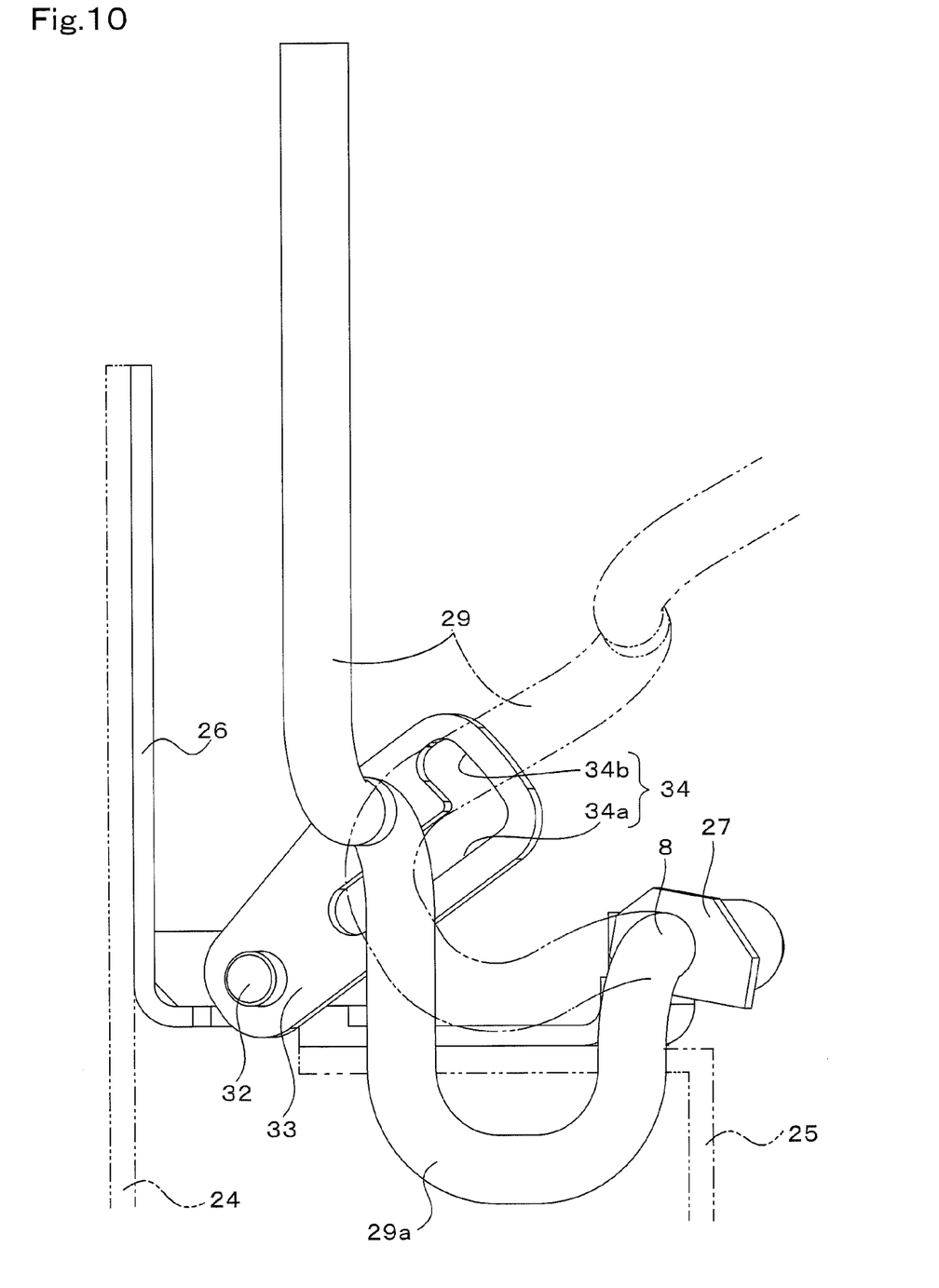
FIG. 10 is a side view of the pivotally supporting mechanism.

As shown in FIGS. 5 and 6, an attachment flange 7a including a back nut is formed on an outer peripheral portion from a front edge to a top edge of the cover side portion 7A, and an attachment rib 7b is integrally formed with an inner surface side of the upper and front portions of the cover upper portion 7B and this attachment rib 7b is secured to the attachment flange 7a via a bolt.

An outer side portion 7c outward from the attachment rib 7b of the upper and front portions of the cover upper portion 7B covers an attachment portion to the attachment flange 7a, and yet the outer side portion 7c has a shape to be smoothly connected to an outer surface of the cover side portion 7A while reducing a step height with respect to the outer surface of the cover side portion 7A.

The attachment rib 7b is formed in correspondence with a ridge line between the upper surface and the outer side portion 7c of the cover upper portion 7B so that the attachment rib 7b is positioned to be a line similar to the ridge line even if there occurs a molding sink at the time of resin molding.

It is noted that, although the cover upper portion 7B may be disposed outside the attachment flange 7a by insert-molding a nut on the outer side portion 7c and then bolted from the inside, a manufacturing cost can be reduced by forming the attachment rib 7b to be attached as described above.

A knob part 7d is formed at an outside portion of the cover upper portion 7B, and a reinforcement material 7e such as a metal bar is inserted to be arranged inside the knob part 7d. Back and forth end portions of this reinforcement material 7e are secured to the upper portion of the sheet metal cover side portion 7A, thereby reinforcing a portion which is to be subjected to a force of the resin knob part 7d. A concave portion 7f is formed in the upper portion of the cover side portion 7A for facilitating insertion of a hand in opposite to the knob part 7d.

In the pivotally supporting mechanism S including the lateral shaft 8, a bearing member 27 is fixed to a supporting base 26 which is fixed to stays 24 and 25 that are provided in a state of standing in the right side of the rotating base 4, and the lateral shaft 8 is integrally formed with a swinging body 29 attached to the inner surface of the sheet metal cover side portion 7A via an attachment plate 28, and this lateral shaft 8 is inserted to the bearing member 27 and swingably supported.

The attachment plate 28 is bolted to an inner surface of the cover side portion 7A, and the bolted portion thereof is covered with the resin cover upper portion 7B so that the bolted portion is not exposed to the outside. Although the attachment plate 28 may be embedded in the cover upper portion 7B by insert-molding, the manufacturing cost is lower by fixing to the cover side portion 7A and covering with the resin cover upper portion 7B rather than that, and the strength thereof can be easily secured.

The lateral shaft 8 and an axial center S1 of the bearing member 27 are inclined at a rearward inclination angle α with respect to a lateral direction line L of the rotating base 4, and this inclination angle α is preferably set to 10 to 30 degrees and is set to about 20 degrees in the present embodiment.

As shown in FIGS. 4 to 10, the swinging body 29 is bent downward from the end portion of the lateral shaft 8 to form a U-character part 29a and it is extended outward and upward from a rear portion of the U-character part 29a so that the extended part is fixed to the attachment plate 28. A pin shaped engagement part 29b is provided in a rear lower portion of the U-character part 29a.

A guide member 33 is pivotally supported on the supporting base 26 via the spindle 32. The spindle 32 is substantially parallel to the lateral shaft 8 and the guide member 33 is substantially perpendicular to the lateral shaft 8. A substantially L-character shaped guide groove 34 is formed in this guide member 33, and the engagement part 29*b* is inserted to be engaged with the guide groove 34 to thereby constitute the open attitude retaining means 12.

The guide groove 34 includes a guide part 34*a* for guiding the engagement part 29*b* at the time of opening and closing the equipment cover 7 and a locking part 34*b* substantially perpendicular to the guide part 34*a* at a tip end thereof. In this configuration, when the engagement part 29*b* is engaged with the locking part 34*b*, a returning operation from a full opened state of the equipment cover 7 is regulated by the guide member 33 acting as a prop so that the opened attitude of the equipment cover 7 is retained.

When the equipment cover 7 is opened to be in a full opened state about the axial center S1 of the rearward inclined lateral shaft 8 as a pivoting center, the rear portion of the equipment cover 7 is moved right-outward and upward to be in a position displaced right-outward from the front lower portion as shown by a two-dotted line in FIG. 1. Thus, the outside surface of the rear upper portion is retained within the outer side edges of the right and left travelling devices 2 to be in an opened state while avoiding interference with an obstacle existing outside the right travelling device 2.

As shown by a two-dotted line in FIG. 3, since the equipment cover 7 in the full opened state is allowed to be opened with a large open angle without interference even though an obstacle exists in front, the upward and sideward regions of the vehicle equipment 6 can be largely opened so that maintenance thereof can be easily performed.

When the guide member 33 slightly raises its front portion upward from the state of the engagement part 29*b* being engaged with the locking part 34*b*, the engagement part 29*b* enters the guide part 34*a* from the locking part 34*b* and the prop regulation is released so that a closing operation of the equipment cover 7 can be performed.

In FIGS. 3 to 6 and 10, the swinging body 29 in a vertical attitude shows a state of the equipment cover 7 being closed and the guide member 33 in a front-raised attitude shows a state of the equipment cover 7 being opened.

Figure 4:
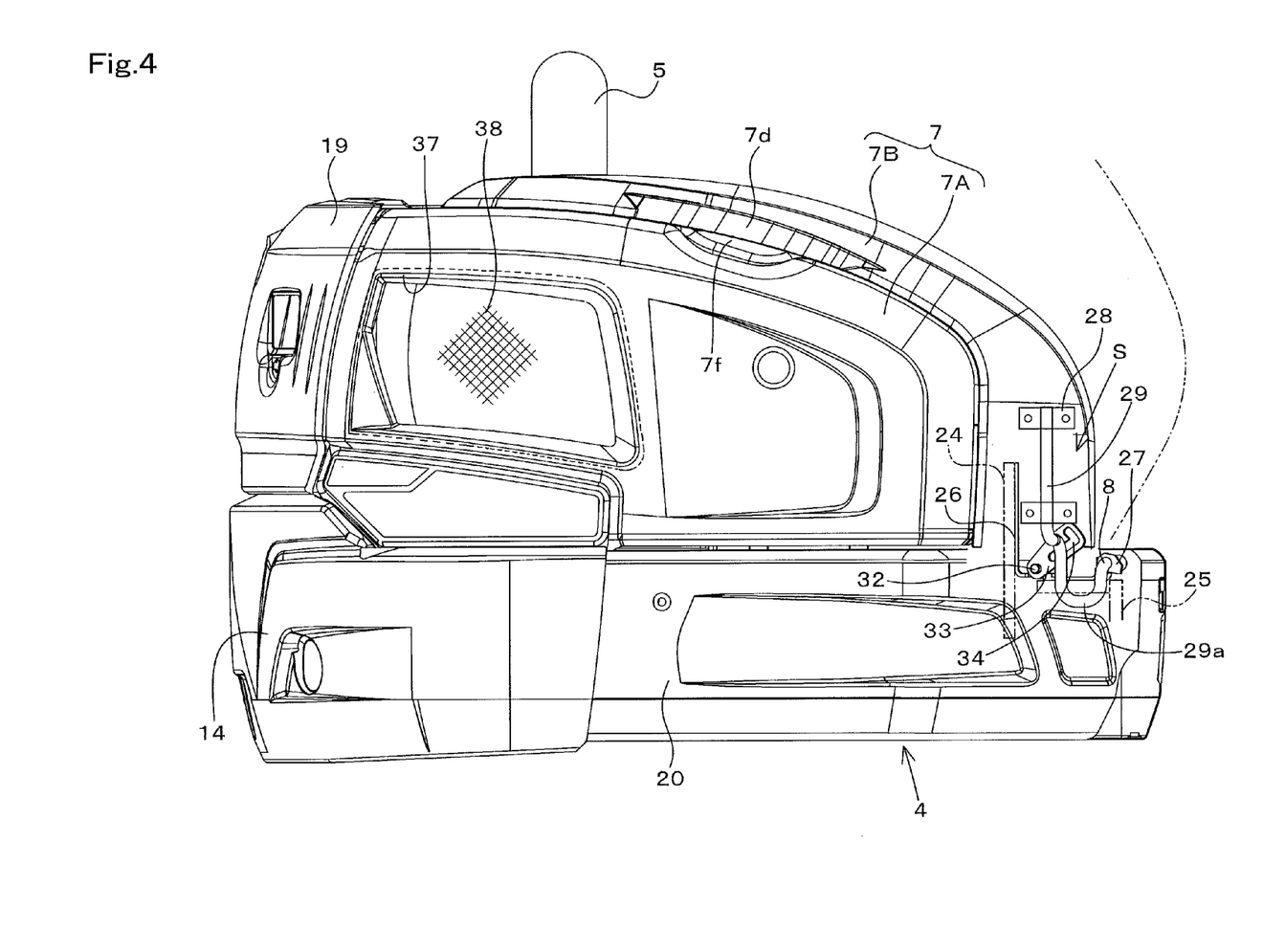
FIG. 4 is a partially cross-sectional side view of a rotating base, the equipment cover and a rotating base side cover.

In FIGS. 3 to 5, an opening 37 is formed in the rear portion of the sheet metal cover side portion 7A for taking in air for cooling the engine 10 and a mesh cover 38 is attached to the opening 37.

Although the mesh cover 38 may be secured to the inner surface of the cover side portion 7A with a plurality of bolts, it is configured that, each of clipper instruments 39 is attached to each of rear and lower two positions of the peripheral portion of the opening 37 and nut tools 40 are provided in addition so that the rear and lower portions of the mesh cover 38 are clipped by the clipper instruments 39 and the other parts are bolted.

By providing the clipper instruments 39, positioning of the mesh cover 38 can be performed and the number of bolts can be reduced so that the number of parts of the mesh cover 38 and a working cost for attachment can be reduced.

In FIGS. 1, 3, 4, 11 and 12, the rear bonnet 19 is formed with sheet metal, and a left side portion thereof is pivotally supported on a left member of a supporting frame 42 that is disposed in a manner of straddling the engine 10 via a pivoting tool 41 while a right side portion thereof is attached to a right member of the supporting frame 42 via a lock in a lockable manner.

Figure 11:
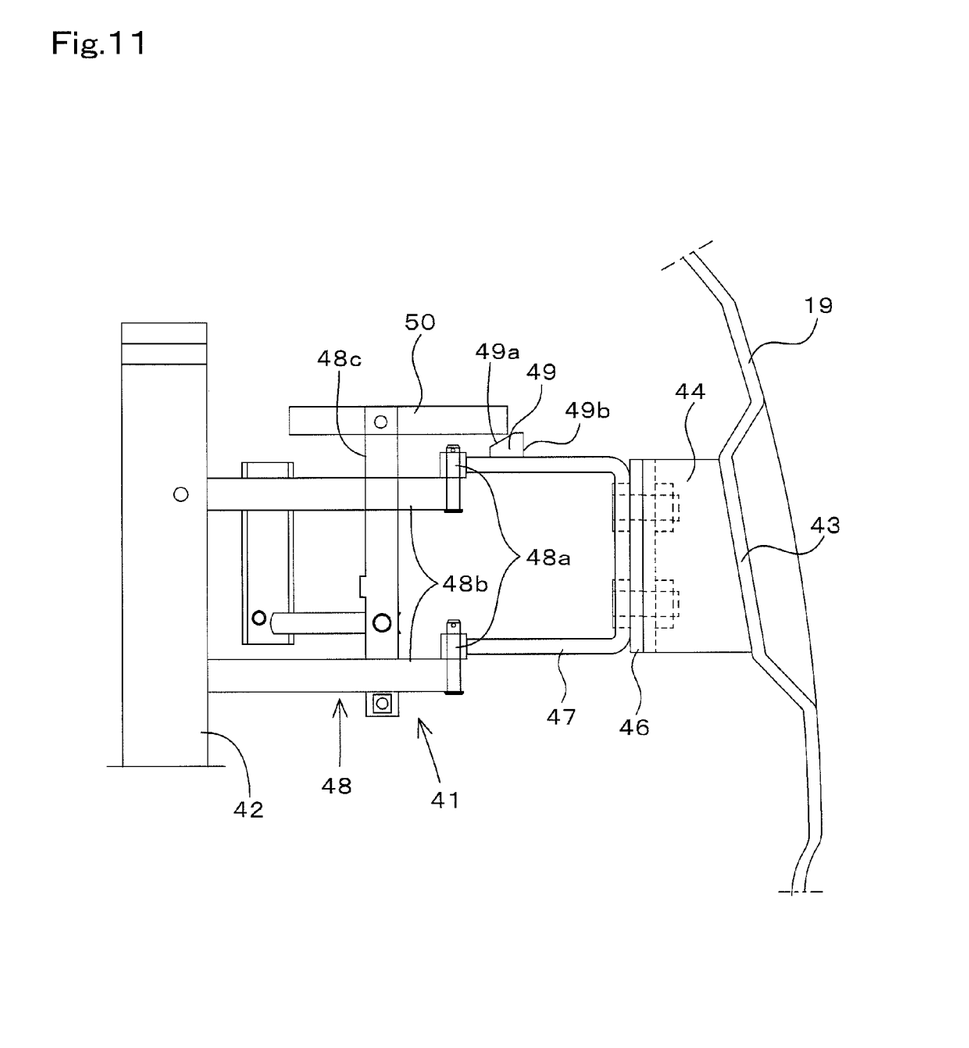
FIG. 11 is a cross-sectional side view showing a supporting structure of a rear bonnet.
Figure 12:
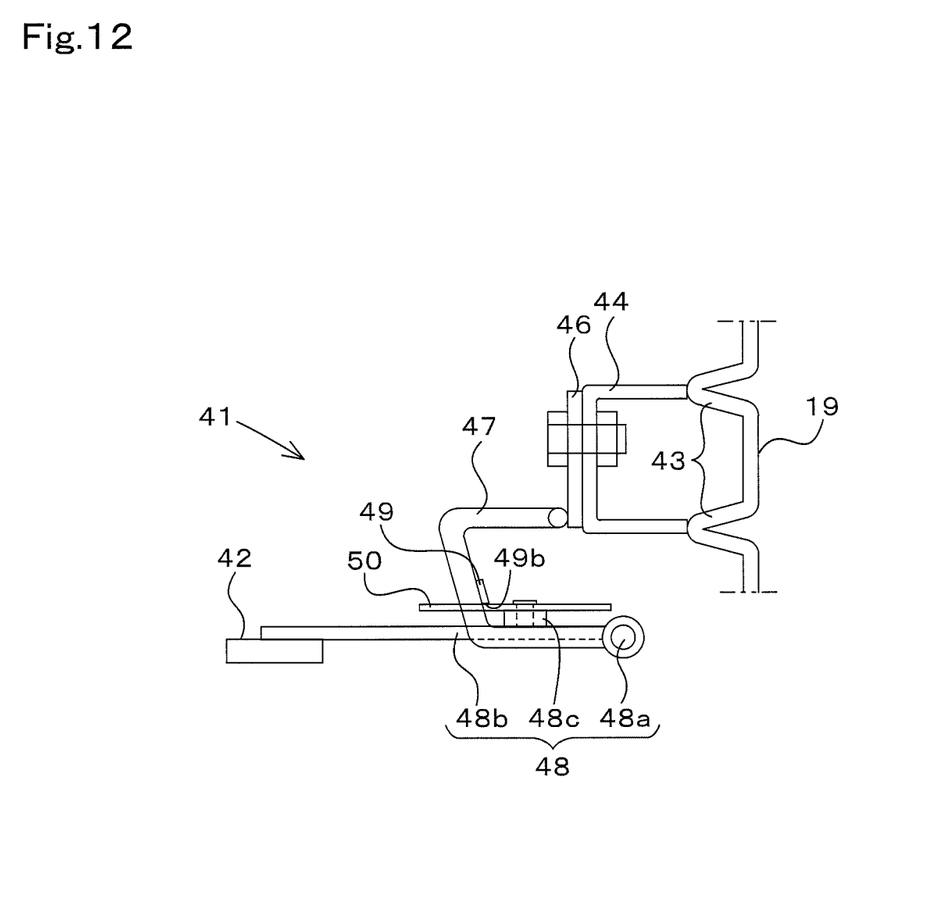
FIG. 12 is a cross-sectional plan view showing the supporting structure of the rear bonnet.

In the right and left side portions of the rear bonnet 19, there are formed two streams of concave and convex 43 elongated in the vertical direction by press molding. The concave and convex 43 are formed to be convex toward the inner surface side of the rear bonnet 19 and both legs of a bracket 44 of a substantially u-character shape in plan view are welded as shown in FIGS. 11 and 12.

In the case where the both legs of the bracket 44 are directly welded to the inner surface of the rear bonnet 19, there occurs a welding distortion in the outer surface of the rear bonnet 19 and therefore a grinding process of the outer surface is required. However, in the case where the concave and convex 43 are previously formed and both legs are welded to the concave and convex 43, it is hard to cause a welding distortion in the outer surface of the rear bonnet 19 and the strength of the rear bonnet 19 per se can be also improved.

The pivoting tool 41 provided between the bracket 44 and the supporting frame 42 is configured in a manner that, a pivoting body 47 which is formed by bending a bar member to have a substantially u-character shape in plan views and in side view is fixed in contact with a plate member 46 which is bolted to the bracket 44, a pin member 48 formed by connecting a pair of upper and lower horizontal plates 48*b* each having a pin 48*a* at a tip end via a vertical plate 48*c* is fixed to the supporting frame 42, and an end portion of the pivoting body 47 is pivotally supported in engagement with the pin 48*a* of the pin member 48 from the upper position.

A lock piece 49 having an inclined upper edge 49*a* is provided on the pivoting body 47 and a lock member 50 is pivotally supported on an upper portion of a vertical plate 48*c* of the pin member 48. When the rear bonnet 19 is shifted from a closed state to an opened state shown in FIG. 12, the pivoting body 47 is rotated about the pin 48*a* and the upper edge 49*a* of the lock piece 49 passes through under the lock member 50 while pushing up the lock member 50. The pivoting body 47 is abutted the vertical plate 48*c* of the pin member 48 to regulate the opening operation any more. At the same time of this, a rear edge 49*b* of the lock piece 49 is engaged with the lock member 50 to thereby regulate the return operation of the pivoting body 47.

In the open position of the rear bonnet 19, since the pivoting body 47 is abutted the vertical plate 48*c* of the pin member 48 and the lock piece 49 is engaged with the lock member 50, the movement of the rear bonnet 19 in the opening direction and closing direction is blocked so that the opened state can be retained.

It is noted that the shapes and respective positional relationships of back and forth, right and left and upper and lower positions of the members in the embodiment of the present invention are the best mode when constituted as shown in FIGS. 1 to 12. However, the present invention is not limited to the above embodiment, and various modifications and combination of the members and configuration can be made.

For example, although the molding cost can be lower and the strength can be increased in the case where the equipment cover 7 is separated into the sheet metal cover side portion 7A and the resin cover upper portion 7B to be molded, the cover side portion 7A and the cover upper portion 7B can be integrally molded with a sheet metal or a resin.

The operating portion including the operation seat 5 can be protected by a cabin instead of the ROPS 16, and the operation seat 5 can be disposed in the frontward right side of the engine 10 of the rotating base 4 and the vehicle equipment 6 and equipment cover 7 may be disposed in the left side thereof.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese application No. 2012-132111 filed on Jun. 11, 2012 is hereby incorporated by reference.

The invention claimed is:

1. A working machine comprising:
   a right travelling device;
   a left travelling device;
   a travelling machine body including the right travelling device and the left travelling device;
   a rotating base installed on the travelling machine body;
   an operation seat arranged on one of right and left sides of the rotating base;
   a vehicle equipment arranged on the other one of the right and left sides of the rotating base;
   an equipment cover provided openably and closably, the equipment cover being configured to cover the vehicle equipment; and
   a lateral shaft configured to pivotally support a front lower portion of the equipment cover on the rotating base, the lateral shaft including:
      one end positioned on a side closer to the operation seat; and
      the other end positioned on a side closer to a side portion of the rotating base, the one end positioning anteriorly to the other end.

2. The working machine according to claim 1, wherein the lateral shaft is inclined at 10 to 30 degrees with respect to a lateral direction line of the rotating base.

3. The working machine according to claim 1, further comprising:
   an engine installed on a rear portion of the rotating base; and
   a working device attached in front of the engine,
   wherein the operation seat is disposed on a left side anteriorly to the engine,
   the vehicle equipment is disposed on a right side anteriorly to the engine, and
   the lateral shaft is disposed on a right forward lower portion of the equipment cover to upwardly turn a rear portion of the equipment cover toward a right outside about the right forward lower portion of the equipment cover.

4. The working machine according to claim 1, further comprising:
   an open attitude retaining means provided adjacent to the lateral shaft of the equipment cover, the open attitude retaining means being configured to retain the equipment cover when the equipment cover is turned, the open attitude retaining means retaining the equipment cover at a position where an outside surface of a rear upper portion of the equipment cover is positioned to be more inside than outside ends of both the right travelling device and the left travelling device,
   wherein the right travelling device has a right outside end protruding outward from a right outside end of the rotating base when the rotating base has an attitude facing forward, and
   wherein the left travelling device has a left outside end protruding outward from a left outside end of the rotating base when the rotating based has an attitude facing forward.

5. The working machine according to claim 1, further comprising:
   a supporting base fixed to the rotating base;
   a bearing member provided on the supporting base; and
   a swinging body attached to an inner surface of a front lower portion of the equipment cover, wherein the lateral shaft is formed integrally on the swinging body and is supported by the bearing member.

6. The working machine according to claim 5, wherein the swinging body includes:
   a U-character shaped part bent downward from an end portion of the lateral shaft; and
   a pin shaped engagement part provided on a lower portion of the U-character shaped part,
   the supporting base includes a spindle being substantially parallel to the lateral shaft, the supporting base pivotally supports a guide member via the spindle,
   the guide member includes a guide groove configured to be engaged with the engagement part when the engagement part is inserted into the guide groove, the guide groove having a substantially L-character shape, and
   the guide groove includes:
      a guide part configured to guide the engagement part when the equipment cover is opened and closed; and
      a locking part configured to retain the equipment cover to be opened when engaged with the engagement part, the locking part being substantially perpendicular to a tip end of the guide part.

7. The working machine according to claim 1, wherein the equipment cover includes:
   a cover side portion formed of sheet metal, the cover side portion being configured to cover the vehicle equipment from a side surface to an upper side surface of the vehicle equipment; and
   a cover upper portion formed of resin, the cover upper portion being attached to an upper portion of and a front portion of the cover side portion to cover an upper surface of and a front surface of the vehicle equipment,
   the cover side portion includes an attachment flange on an outer peripheral portion of the cover side portion, the outer peripheral portion being formed from a front edge of the cover side portion to a top edge of the cover side portion, and
   the cover upper portion includes:
      an attachment rib formed integrally on inner surface sides of an upper portion of and a front portion of the cover upper portion, the attachment rib being configured to be attached to the attachment flange; and
      an outer side portion protruding outward from the attachment rib to cover an attachment portion to the attachment flange, the cover side portion forming the attachment rib corresponding to a ridge line between an upper surface of the cover upper portion and an outer side portion of the cover upper portion.

8. The working machine according to claim 7, wherein the cover upper portion includes a knob part at an outside portion of the cover upper portion, the knob part having a reinforcement member inserted inside the knob part, and the reinforcement member is secured to the upper portion of the cover side portion at front and rear end portions of the reinforcement member.

9. A working machine comprising:
   a right crawler travelling device;
   a left crawler travelling device;
   a travelling machine body including the right crawler travelling device and the left crawler travelling device;
   a rotating base installed on the travelling machine body to be rotatable about a vertical axis;
   an engine installed on a rear portion of the rotating base;
   a driver seat protecting device and an operating portion including an operation seat, the driver seat protecting device and the operating portion being disposed on a left side anteriorly to the engine;

a vehicle equipment including a hydraulic oil tank, the vehicle equipment being disposed on a right side anteriorly to the engine;

a working device configured to perform an excavation work, the working device being attached to a front portion of the rotating base;

an equipment cover configured to cover the vehicle equipment; and a pivotally supporting mechanism including a lateral shaft having an axial center, the axial center being inclined rearward at an angle of 10 to 30 degrees with respect to a lateral direction line of the rotating base from one end positioned on a side closer to the operation seat to the other end positioned on a side closer to a side portion of the rotating base, provided between an inner surface of a front lower portion of the equipment cover and the front portion of the rotating base, supporting the equipment cover openably and closably about an axial about the axial center of the lateral shaft to upwardly turn a rear portion of the equipment cover toward an outside with respect to the rotating base, and including an open attitude retaining means configured to retain the equipment cover when the equipment cover is turned, the open attitude retaining means retaining the equipment cover at a position where an outside surface of the rear upper portion of the equipment cover is positioned to be more inside than outside ends of both the right crawler travelling device and the left crawler travelling device, the outside surface being upwardly turned toward a right outside to be displaced toward the right outside.

* * * * *